United States Patent [19]

Wong

[11] Patent Number: 4,919,456
[45] Date of Patent: Apr. 24, 1990

[54] UNION FOR PIPE OR TREE WITH METAL AND RESILIENT SEALS

[75] Inventor: Kwok-Ping Wong, The Colony, Tex.

[73] Assignee: Otis Engineering Corporation, Dallas, Tex.

[21] Appl. No.: 335,893

[22] Filed: Apr. 10, 1989

[51] Int. Cl.$^5$ .............................................. F16L 19/02
[52] U.S. Cl. .................... 285/39; 285/334.2; 285/351; 285/354; 285/901; 285/917
[58] Field of Search ...................... 285/334.2, 351, 354, 285/901, 917, 334.1, 334.3, 39

[56] References Cited

U.S. PATENT DOCUMENTS

| | | | |
|---|---|---|---|
| 2,305,668 | 12/1942 | Bruno | 285/354 X |
| 2,340,732 | 2/1944 | Bruno | 285/334.2 X |
| 3,113,792 | 12/1963 | Brown | 285/354 |
| 3,116,944 | 1/1964 | Parker | 285/351 X |
| 3,288,498 | 11/1966 | Billeter | 285/334.1 |
| 4,209,193 | 6/1980 | Ahlstone | 285/354 X |
| 4,403,795 | 9/1983 | Davlin | 285/334.2 X |
| 4,575,044 | 3/1986 | Gentry | 285/388 X |
| 4,659,116 | 4/1987 | Cameron | 285/354 X |
| 4,801,160 | 1/1989 | Barrington | 285/354 X |

OTHER PUBLICATIONS

Composite Catalog of Oil Field Equipment and Services, 1988–1989, vol. 3, 4 pages.
Composite Catalog of Oil Field Equipment and Services, 1982–1983, vol. 3, 4 pages.
Composite Catalog of Oil Field Equipment and Services, 1988–1989, vol. 2, 4 pages.

*Primary Examiner*—Thomas F. Callaghan
*Attorney, Agent, or Firm*—Roland O. Cox

[57] ABSTRACT

Disclosed is a pipe union having a reliable metal ring seal and a resilient seal. The resilient seal is on the pin portion of the union, which has an internal seal surface. The box portion of the union has a bore to sealingly receive the resilient seal and an internal seal surface. The metal ring seal is compressed into sealing engagement with the pin portion and box portion sealing surfaces when the union pin portion and union box portion are connected together by a threaded collar. When the union is utilized in a tree cap for an underwater wellhead and the union box portion is attached to the wellhead, the resilient seal serves as a secondary seal and protects the metal seal. Well servicing risers or lubricators may be connected to the tree cap box portion.

15 Claims, 1 Drawing Sheet

UNION FOR PIPE OR TREE WITH METAL AND RESILIENT SEALS

BACKGROUND OF THE INVENTION (1) Technical Field

This invention pertains to unions and pertains particularly to a union which may be utilized in a tree cap connectable on a production wellhead.

(2) Description of the Related Art

Many forms of unions or couplings are shown in the 38th revision 1988–89, "COMPOSITE CATALOG OF OIL FIELD EQUIPMENT AND SERVICES", published by Gulf Publishing Company, P.O. Box 2608, Houston, TX 77252. An example of a coupling utilizing a metal seal ring is shown on page 3327 of volume 3 of the previously mentioned publication. On page 3349, also in volume 3, are shown various forms of christmas tree caps utilizing metal seal rings. Also in volume 3, on page 4051, is shown a tree cap having a resilient seal and metal seal surfaces for sealing. Pages 2206 and 2207 of volume 2 depict various forms of unions utilizing metal seal surfaces, metal seal surfaces with resilient seals or resilient seals alone for sealing. The form of FIGURE 600 on page 2206 shows a union having a separate bronze seat insert ring for additional pressure sealing capability.

DISCLOSURE OF INVENTION

This invention provides a union, useful to connect pipe and in a tree cap, having both a separate metal ring and a resilient seal for sealing. A metal ring seal is more reliable and longer lasting than resilient seals, which deteriorate more rapidly than metal when in extremely high temperature and corrosive environments. Unions having reliable metal seals are very desirable for use where long lasting permanently sealable unions are required and are especially suited for use in tree caps for underwater wellheads. When the union of this invention is utilized in an underwater wellhead tree cap, the resilient seal serves as a secondary seal and protects the metal ring. An underwater well equipped with the tree cap of this invention may be serviced by disconnecting the collar and union pin portion from the union box portion which is attached to the wellhead. Risers or lubricator sections may be connected to the union box portion for well entry and servicing operations. When risers or lubricators are temporarily connected for well servicing, the resilient seal or metal ring seal or both seals may be used to seal the union pin portion to the union box portion.

A principal object of this invention is to provide a reliable permanently sealable union having a metal seal and a resilient seal.

Another object of this invention is to provide a reliable permanently sealable tree cap for an underwater wellhead having a primary metal seal ring and a secondary resilient seal protecting the primary seal ring.

Also an object of this invention is to provide a reliable permanently sealable tree cap having a box union portion attached to the wellhead to which a lubricator or riser may be connected for well servicing.

DESCRIPTION OF THE PREFERRED EMBODIMENTS

Figure 1:
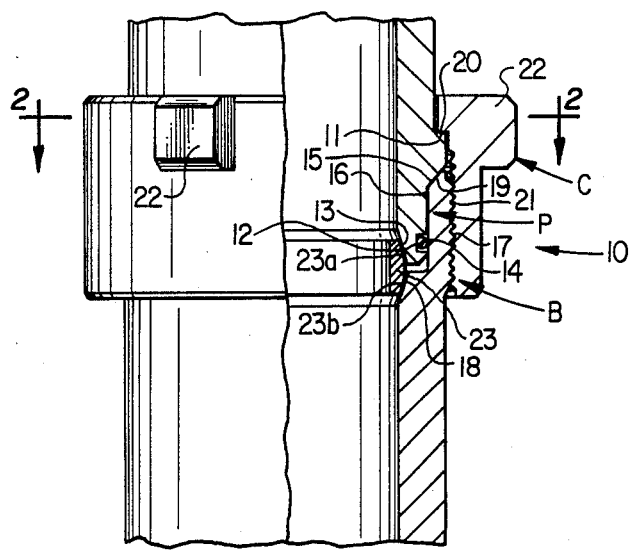
FIG. 1 is a half section drawing in elevation of the union of this invention.

FIG. 1 shows the preferred form of the pipe union 10 of this invention wherein a pin portion P has been formed on the end of a pipe and a box portion B has been formed on the end of another pipe. The pin portion has an external shoulder 11, a groove around 12 and a sealing surface 13. A resilient seal 14 is provided in the groove. The pin portion may also include a frusto-conical seal surface 15.

Box portion B includes a seal bore 16, in which resilient seal 14 is sealingly engageable, threads 17 and a seal surface 18. The box portion may also include a frusto-conical seal surface 19, which may be sealingly engage seal surface 15.

Figure 2:
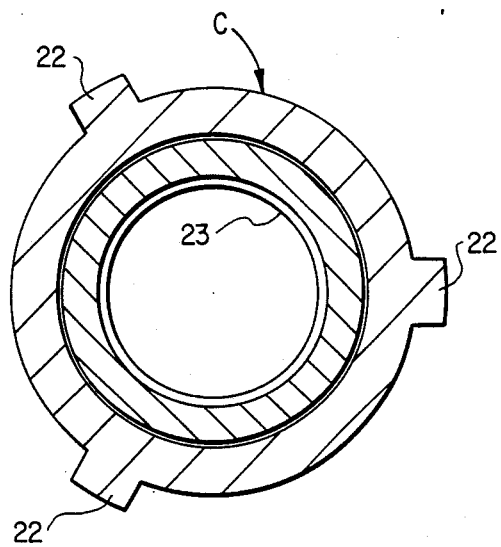
FIG. 2 is a drawing in section of the invention union along line 2—2 of FIG. 1

A collar C around the pin portion is provided with internal shoulder 20, threads 21 and at least one ear 22. The collar show in FIGS. 1 and 2 has the usual complement of three ears.

FIG. 1 shows the pipe union of this invention wherein a metal seal ring 23 has been installed to sealingly engage box portion seal surface 18. The pin portion, with resilient 14 sealingly engaging seal bore 16, has been moved into the box portion by engaging collar threads 21 with box portion threads 17 and turning the collar which forces the pin portion through shoulders 20 and 11 into the box portion until pin seal surface 13 is engaged with ring seal surface 23a and ring seal surface 23b is engaged with box seal surface 18. Hammer blows (impacting forces) have been applied to collar ears 22 or turning torque applied to collar C to move seal surfaces 13 and 18 together with sufficient force to compress ring sealing surfaces 23a and 23b into sealing engagement with pin surface 13 and box surface 18, respectively, sealing the pin and box portions of the union together. Collar C now connects the union pin and box portions together, positions resilient seal 14 sealingly engaged in seal bore 16 and maintains sealingly engaging compressive forces on metal ring 18.

If the pin and box union portions include sealingly engageable frusto-conical sealing surfaces 15 and 19, further tightening of collar C on box threads 21 will compress metal seal ring 23 more and permit sealing engagement of surfaces 15 and 19.

All persons having ordinary skill in union art know that pin and box union portions may be formed on the end of pipes or lubricator sections as in U.S. Pat. No. 4,575,044 to Gentry, which is herein incorporated be reference. Pin and box union portions may also be connected to pipes in a number of ways including, but not limited to by threading, and welding as in examples previously cited in related art.

Figure 3:
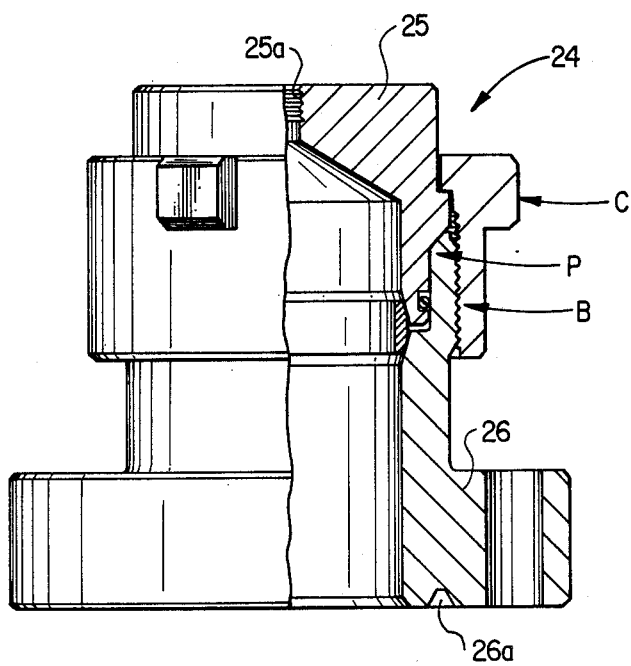
FIG. 3 is a half section drawing in elevation of a tree cap for a wellhead, which utilizes the union of FIG. 1.

FIG. 3 shows a preferred form of the union of this invention, which is utilized in a tree cap 24 on the production wellhead ("christmas tree") of a well. The pin portion P of the union of this invention has been formed on a blanking plug 25, which prevents flow from inside the tree cap and wellhead to outside the tree cap and wellhead. The blanking plug has a thread 25a in a passageway for communicating pressure inside the tree cap to a gauge (not shown) connected in thread 25a on top of the blanking plug. The box portion B of the invention pipe union has been formed on half a well known bolted flange connection 26 for connecting on top a wellhead. The bolted flange connection shown utilizes a metal ring (not shown) in a groove 26a, which is compressed between flange halves for sealing. The flange connection could just as well be of the type utilizing a compressed non metal gasket for a seal. A tree cap is usually connected on top a wellhead with a flange type connection, but any form of an appropriate connection may be used to connect the union box portion of the tree cap of this invention to a wellhead.

The same collar C, which connects the union pin portion and the union box portion together in sealing relationship, also connects the tree cap blanking plug pin portion and tree cap box portion, which is connected to the wellhead, together in sealing relationship. As in the pipe union form of this invention, metal seal ring 23 has been installed in the tree cap invention form of FIG. 3. The blanking plug pin portion with the resilient seal has been moved into the box portion seal bore by turning and hammering collar C until the blanking plug pin and box are compressing the metal ring between them into sealing engagement.

The pin portion of the pipe union and tree cap may be disconnected from their respective box portions by hammering the collar ears and unscrewing the collar from the box portion threads, permitting the pin portions to be withdrawn from their box portions.

What I claim is:

1. A union for pipe comprising:
   (a) a pin portion having a resilient seal thereon and a sealing surface therein;
   (b) a box portion having threads thereon, a seal bore therein for sealingly receiving said resilient seal, and a sealing surface therein below said seal bore;
   (c) a metal seal ring for sealingly engaging said pin portion sealing surface and said box portion sealing surface; and
   (d) connecting means for positioning said resilient seal in sealing engagement in said box portion seal bore and said metal seal ring in sealing engagement with said pin portion and box portion sealing surfaces and for connecting said pin and box portions together.

2. The union of claim 1 wherein the pin portion includes:
   (a) a groove around said pin portion for receiving the resilient seal; and
   (b) an external shoulder above said groove.

3. The union of claim 2 wherein the pin portion further includes an external sealing surface between the groove and shoulder and the box portion includes a sealing surface sealingly engageable with said pin portion external sealing surface.

4. The union of claim 2 wherein the connecting means is a collar, said collar having an internal shoulder engageable with the pin portion external shoulder and internal threads threadedly engageable with the box portion threads.

5. The union of claim 4 wherein the collar has at least one ear thereon.

6. A union for pipe having a resilient seal and a metal seal ring comprising:
   (a) a pin portion having
      an external shoulder and
      a groove below said external shoulder thereon, and
      a sealing surface therein;
   (b) a resilient seal in said groove;
   (c) a box portion having
      threads thereon,
      an internal seal bore, and
      a sealing surface therein below said seal bore;
   (d) a metal seal ring for sealingly engaging said pin portion sealing surface and said box portion sealing surface; and
   (e) a collar around said pin portion, said collar having an internal shoulder engageable with said pin portion external shoulder and internal threads engageable with said box portion threads.

7. The union of claim 6 wherein the pin portion further includes an external sealing surface thereon between the external shoulder and groove, and the box portion includes a sealing surface sealingly engageable with said pin portion external sealing surface.

8. A tree cap for a wellhead comprising:
   (a) a blanking plug having a union pin portion on one end thereof, said pin portion having a sealing surface therein;
   (b) a resilient seal on said union pin portion;
   (c) a union box portion connectible to a wellhead, said union box portion having threads thereon, a seal bore therein for sealingly receiving said resilient seal and a sealing surface therein below said seal bore;
   (d) a metal seal ring for sealingly engaging said pin portion sealing surface and said box portion sealing surface; and
   (e) connecting means for positioning said resilient seal in sealing engagement in said box portion seal bore and said metal seal ring in sealing engagement with said pin portion and box portion sealing surfaces and for connecting said pin and box portions together.

9. The tree cap of claim 8 wherein the blanking plug has a passage therethrough having a thread therein.

10. The tree cap of claim 8 wherein the blanking plug pin portion includes a groove around for receiving the resilient seal and an external shoulder thereon.

11. The tree cap of claim 10 wherein the blanking plug pin portion further includes an external sealing surface thereon between the groove and shoulder and the union box portion has a sealing surface sealingly engageable with said pin portion external sealing surface.

12. The tree cap of claim 10 wherein the connecting means is a collar, said collar having an internal shoulder engageable with the blanking plug pin portion external shoulder and internal threads engageable with the union box portion threads.

13. The tree cap of claim 12 wherein the collar has at least one ear thereon.

14. A tree cap having a resilient seal and a metal seal ring comprising:
   (a) a blanking plug having a union pin portion on one end thereof, said pin portion including
      an external shoulder and
      a groove below said external shoulder thereon, and
      a sealing surface therein;
   (b) a resilient seal in said groove;
   (c) a union box portion connectible to a wellhead, said union box portion having
      threads thereon,
      an internal seal bore, and
      a sealing surface therein below said seal bore;
   (d) a metal seal ring for sealingly engaging said blanking plug in portion sealing surface and said union box portion sealing surface; and (e) a collar around said blanking plug pin portion, said collar having an internal shoulder engageable with said union pin portion external shoulder and internal threads engageable with said union box portion threads.

15. The tree cap of claim 14 wherein the blanking plug union pin portion includes a sealing surface thereon between the external shoulder and groove, and the union box portion includes therein a sealing surface sealingly engageable with said union pin portion sealing surface.

* * * * *